(12) United States Patent
Kovvali et al.

(10) Patent No.: US 8,717,890 B2
(45) Date of Patent: May 6, 2014

(54) APPLICATION, USAGE AND RADIO LINK AWARE TRANSPORT NETWORK SCHEDULER

(75) Inventors: Surya Kumar Kovvali, Westborough, MA (US); Ramji Raghavan, Winchester, MA (US); Krishnan Ramakrishnan, Hopkinton, MA (US); Ronald Parker, Boxborough, MA (US); Christopher Leary, Amherst, NH (US); Charles W. Boyle, Upton, MA (US); Nizar K. Purayil, Bangalore (IN)

(73) Assignee: Movik Networks, Westford, MA (US)

( * ) Notice: Subject to any disclaimer, the term of this patent is extended or adjusted under 35 U.S.C. 154(b) by 742 days.

(21) Appl. No.: 12/696,378

(22) Filed: Jan. 29, 2010

(65) Prior Publication Data

US 2010/0195602 A1 Aug. 5, 2010

Related U.S. Application Data

(60) Provisional application No. 61/148,454, filed on Jan. 30, 2009.

(51) Int. Cl.
| H04L 1/00 | (2006.01) |
| H04L 12/26 | (2006.01) |
| H04L 12/28 | (2006.01) |
| G01R 31/08 | (2006.01) |
| G06F 11/00 | (2006.01) |

(52) U.S. Cl.
USPC ........ 370/232; 370/229; 370/230; 370/230.1; 370/231; 370/233; 370/234; 370/235; 370/329; 455/450; 455/451; 455/452.1; 455/452.2

(58) Field of Classification Search
USPC ......... 370/325, 328, 352, 389, 400, 401, 466, 370/468, 229–235; 455/410, 418, 425, 455/426.1, 455, 450–452.2; 709/227, 228, 709/232

See application file for complete search history.

(56) References Cited

U.S. PATENT DOCUMENTS

| 5,990,810 A | 11/1999 | Williams |
| 6,105,064 A * | 8/2000 | Davis et al. .................. 709/224 |

(Continued)

FOREIGN PATENT DOCUMENTS

| CN | 1754369 A | 3/2006 |
| CN | 101299770 A | 11/2008 |

(Continued)

OTHER PUBLICATIONS

European Communication mailed Jul. 5, 2012 in corresponding European patent application No. EP 10736460.6.

(Continued)

*Primary Examiner* — Olumide T Ajibade Akonai
(74) *Attorney, Agent, or Firm* — Nields, Lemack & Frame, LLC

(57) ABSTRACT

A packet scheduling method and apparatus with the knowledge of application behavior, anticipated usage/behavior based on the type of content, and underlying transport conditions during the time of delivery, is disclosed. This type of scheduling is applicable to a content server or a transit network device in wireless (e.g., 3G, WIMAX, LTE, WIFI) or wire-line networks. Methods for identifying or estimating rendering times of multi-media objects, segmenting a large media content, and automatically pausing or delaying delivery are disclosed. The scheduling reduces transit network bandwidth wastage, and facilitates optimal sharing of network resources such as in a wireless network.

7 Claims, 10 Drawing Sheets

Application-Aware Scheduler Operation

(56) References Cited

U.S. PATENT DOCUMENTS

| | | | |
|---|---|---|---|
| 6,694,349 B1 | 2/2004 | Zou | |
| 6,798,786 B1 | 9/2004 | Lo et al. | |
| 6,907,501 B2 | 6/2005 | Tariq et al. | |
| 6,917,984 B1 | 7/2005 | Tan | |
| 6,996,085 B2 | 2/2006 | Travostino et al. | |
| 7,047,312 B1* | 5/2006 | Aweya et al. | 709/235 |
| 7,177,273 B2 | 2/2007 | Peelen et al. | |
| 7,318,100 B2 | 1/2008 | Demmer et al. | |
| 7,333,431 B2 | 2/2008 | Wen et al. | |
| 7,412,531 B1 | 8/2008 | Lango et al. | |
| 7,489,690 B2 | 2/2009 | Kakadia | |
| 7,568,071 B2* | 7/2009 | Kobayashi et al. | 711/126 |
| 7,583,594 B2* | 9/2009 | Zakrzewski | 370/229 |
| 7,602,872 B2 | 10/2009 | Suh et al. | |
| 7,734,804 B2 | 6/2010 | Lorenz et al. | |
| 7,739,383 B1 | 6/2010 | Short et al. | |
| 7,797,369 B2* | 9/2010 | Glickman | 709/201 |
| 7,965,634 B2* | 6/2011 | Aoyanagi | 370/235 |
| 7,991,905 B1 | 8/2011 | Roussos et al. | |
| 8,111,630 B2 | 2/2012 | Kovvali et al. | |
| 8,161,158 B2* | 4/2012 | Curcio et al. | 709/226 |
| 8,190,674 B2 | 5/2012 | Narayanan et al. | |
| 8,208,430 B2 | 6/2012 | Valmikam et al. | |
| 2003/0003919 A1 | 1/2003 | Beming et al. | |
| 2003/0120805 A1 | 6/2003 | Couts et al. | |
| 2003/0145038 A1 | 7/2003 | Bin Tariq et al. | |
| 2003/0179720 A1* | 9/2003 | Cuny | 370/310 |
| 2003/0195977 A1 | 10/2003 | Liu et al. | |
| 2004/0068571 A1 | 4/2004 | Ahmavaara | |
| 2004/0098748 A1 | 5/2004 | Bo et al. | |
| 2004/0193397 A1 | 9/2004 | Lumb et al. | |
| 2004/0214586 A1 | 10/2004 | Loganathan et al. | |
| 2004/0223505 A1 | 11/2004 | Kim et al. | |
| 2004/0240390 A1* | 12/2004 | Seckin | 370/252 |
| 2004/0258070 A1 | 12/2004 | Arima | |
| 2004/0264368 A1 | 12/2004 | Heiskari et al. | |
| 2005/0033857 A1* | 2/2005 | Imiya | 709/232 |
| 2005/0047416 A1 | 3/2005 | Heo et al. | |
| 2005/0097085 A1 | 5/2005 | Shen et al. | |
| 2005/0117583 A1* | 6/2005 | Uchida et al. | 370/395.4 |
| 2005/0135428 A1 | 6/2005 | Hellgren | |
| 2005/0136973 A1 | 6/2005 | Llamas et al. | |
| 2005/0157646 A1 | 7/2005 | Addagatla et al. | |
| 2006/0018294 A1 | 1/2006 | Kynaslahti et al. | |
| 2006/0019677 A1 | 1/2006 | Teague et al. | |
| 2006/0117139 A1 | 6/2006 | Kobayashi et al. | |
| 2006/0159121 A1 | 7/2006 | Sakata et al. | |
| 2006/0167975 A1 | 7/2006 | Chan et al. | |
| 2006/0198378 A1 | 9/2006 | Rajahalme | |
| 2006/0274688 A1 | 12/2006 | Maxwell et al. | |
| 2007/0019553 A1 | 1/2007 | Sagfors et al. | |
| 2007/0019599 A1 | 1/2007 | Park et al. | |
| 2007/0025301 A1* | 2/2007 | Petersson et al. | 370/338 |
| 2007/0070894 A1 | 3/2007 | Wang et al. | |
| 2007/0113013 A1 | 5/2007 | Knoth | |
| 2007/0143218 A1* | 6/2007 | Vasa | 705/51 |
| 2007/0174428 A1 | 7/2007 | Lev Ran et al. | |
| 2007/0223379 A1 | 9/2007 | Sivakumar et al. | |
| 2007/0230342 A1* | 10/2007 | Skog | 370/232 |
| 2007/0248048 A1 | 10/2007 | Zhu et al. | |
| 2007/0254671 A1 | 11/2007 | Liu | |
| 2008/0026789 A1 | 1/2008 | Llamas et al. | |
| 2008/0052366 A1 | 2/2008 | Olsen et al. | |
| 2008/0081637 A1* | 4/2008 | Ishii et al. | 455/453 |
| 2008/0082753 A1 | 4/2008 | Licht et al. | |
| 2008/0162713 A1 | 7/2008 | Bowra et al. | |
| 2008/0186912 A1 | 8/2008 | Huomo | |
| 2008/0191816 A1* | 8/2008 | Balachandran et al. | 333/24 R |
| 2008/0195745 A1* | 8/2008 | Bowra et al. | 709/231 |
| 2008/0212473 A1 | 9/2008 | Sankey et al. | |
| 2008/0273533 A1 | 11/2008 | Deshpande | |
| 2008/0320151 A1 | 12/2008 | McCanne et al. | |
| 2009/0019178 A1 | 1/2009 | Melnyk et al. | |
| 2009/0019229 A1 | 1/2009 | Morrow et al. | |
| 2009/0024835 A1 | 1/2009 | Fertig et al. | |
| 2009/0029644 A1 | 1/2009 | Sue et al. | |
| 2009/0043906 A1 | 2/2009 | Hurst et al. | |
| 2009/0156213 A1 | 6/2009 | Spinelli et al. | |
| 2009/0196233 A1 | 8/2009 | Zhu et al. | |
| 2009/0210904 A1 | 8/2009 | Baron et al. | |
| 2009/0274224 A1 | 11/2009 | Harris | |
| 2009/0287842 A1 | 11/2009 | Plamondon | |
| 2009/0291696 A1 | 11/2009 | Cortes et al. | |
| 2010/0020685 A1 | 1/2010 | Short et al. | |
| 2010/0023579 A1 | 1/2010 | Chapweske et al. | |
| 2010/0034089 A1 | 2/2010 | Kovvali et al. | |
| 2010/0057887 A1 | 3/2010 | Wang et al. | |
| 2010/0085962 A1 | 4/2010 | Issaeva et al. | |
| 2010/0088369 A1 | 4/2010 | Sebastian et al. | |
| 2010/0106770 A1 | 4/2010 | Taylor et al. | |
| 2010/0158026 A1 | 6/2010 | Valmikam et al. | |
| 2010/0184421 A1 | 7/2010 | Lindqvist et al. | |
| 2010/0215015 A1 | 8/2010 | Miao et al. | |
| 2010/0254462 A1 | 10/2010 | Friedrich et al. | |
| 2010/0272021 A1 | 10/2010 | Kopplin et al. | |
| 2011/0116460 A1 | 5/2011 | Kovvali et al. | |
| 2011/0167170 A1 | 7/2011 | Kovvali et al. | |
| 2012/0099533 A1 | 4/2012 | Kovvali et al. | |
| 2012/0184258 A1 | 7/2012 | Kovvali et al. | |
| 2012/0191862 A1 | 7/2012 | Kovvali et al. | |

FOREIGN PATENT DOCUMENTS

| | | |
|---|---|---|
| EP | 1445703 A1 | 8/2004 |
| EP | 1523171 A1 | 4/2005 |
| EP | 2197187 A1 | 6/2010 |
| JP | 2001-518744 A | 10/2001 |
| JP | 2006-92341 A | 4/2006 |
| JP | 2006-155121 A | 6/2006 |
| JP | 2006-196008 A | 7/2006 |
| JP | 2007-536818 A | 12/2007 |
| WO | 99/17499 A2 | 4/1999 |
| WO | 2005/109825 A1 | 11/2005 |
| WO | 2007/016707 A2 | 2/2007 |
| WO | 2008/076073 A1 | 6/2008 |
| WO | 2009/096833 A1 | 8/2009 |
| WO | 2010/017308 A1 | 2/2010 |
| WO | 2010/088490 A1 | 8/2010 |

OTHER PUBLICATIONS

Notice of Allowance mailed Oct. 13, 2011 in co-pending U.S. Appl. No. 12/536,537.

Office Action mailed Nov. 10, 2011 in co-pending U.S. Appl. No. 12/645,009.

3GPP TR 23.829 V0.4.0 (Jan. 2010), Technical Report, "3rd Generation Partnership Project; Technical Specification Group Services and System Aspects; Local IP Access and Selected IP Traffic Offload; (Release 10)", 29 pages, 3GPP Organizational Partners.

Http header enrichment, http://news.thomasnet.com/fullstory/Software-optimizes-high-speed-wireless-data-networks-485934, "Software optimizes high-speed wireless data networks", Jun. 26, 2006, 10 pages, Thomasnet News.

Office Action dated Mar. 15, 2011 in co-pending U.S. Appl. No. 12/536,537.

International Search Report and Written Opinion dated May 13, 2011 in co-pending foreign patent application No. PCT/US11/28477.

RFC 1644—T/TCP—TCP Extensions for Translations Functional Specification, R. Braden, Jul. 1994—http://www.faqs.org/rfcs/rfc1644.html.

RFC 3135—Performance Enhancing Proxies Intended to Mitigate Link-Related Degradations, J. Border et al.; Jun. 2001—http://www.faqs.org.rfcs/rfc3135.html.

RFC 2045—Multipurpose Internet Mail Extensions (MIME) Part One: Formal of Internet Message bodies; N. Freed et al.; Nov. 1996—http://www.faqs.org/rfcs/rfc2045.html.

Chinese Communication, with English translation, issued May 10, 2013 in co-pending Chinese patent application No. 200980139488.3.

English translation of Japanese Communication, mailed Aug. 13, 2013 in co-pending Japanese patent application No. 2011-522222.

(56) References Cited

OTHER PUBLICATIONS

Notice of Allowance mailed Sep. 19, 2013 in co-pending U.S. Appl. No. 13/339,629.
International Search Report and Written Opinion completed Mar. 3, 2011 in PCT application No. PCT/US2010/056073.
Office Action mailed Sep. 18, 2012 in co-pending U.S. Appl. No. 12/942,913.
Office Action mailed Jul. 19, 2013 in co-pending U.S. Appl. No. 12/942,913.
Office Action mailed Apr. 30, 2013 in co-pending U.S. Appl. No. 13/048,378.
Notice of Allowance mailed May 29, 2013 in co-pending U.S. Appl. No. 13/339,629.
Proceedings of the USENIX Symposium on Internet Technologies and Systems, Dec. 1997, "Cost-Aware WWW Proxy Caching Algorithms", 15 pages, Cao, et al.
The Book of Webmin . . . Or: How I Learned to Stop Worrying and Love UNIX, 2003, Chapter 12—Squid, 23 pages, Cooper.
Proceedings of the 3rd International Workshop on Modeling Analysis and Simulation of Wireless and Mobil Systems (MSWIM '00), ACM, 2000, pp. 77-84, "Prefetching Policies for Energy Saving and Latency Reduction in a Wireless Broadcast Data Delivery System", Grassi.
Eighth ACIS International Conference on Software Engineering, Artificial Intelligence, Networking, and Parallel/Distributed Computing, IEEE, 2007, "An Integrated Prefetching and Caching Scheme for Mobile Web Caching System", p. 522-527, Jin, et al.
Proceedings of the 22nd International Conference on Distributed Computing Systems (ICDCS '02), IEEE, 2002, "Power-Aware Prefetch in Mobile Environments", 8 pages, Yin, et al.
Office Action mailed Apr. 12, 2013 in co-pending U.S. Appl. No. 13/185,066.
Final Rejection mailed Oct. 29, 2013 in co-pending U.S. Appl. No. 13/048,378.
Office Action mailed Jan. 2, 2013 in co-pending U.S. Appl. No. 13/339,629.
Chinese Communication dispatched Feb. 16, 2013 in corresponding Chinese patent application No. CN 201080010586.X.

\* cited by examiner

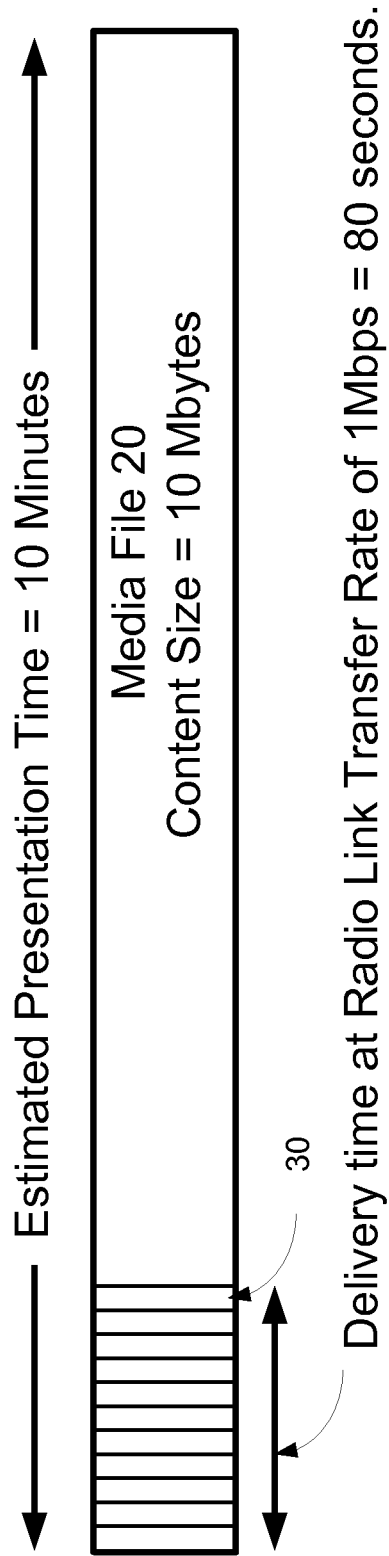
Figure 1: Multimedia file delivery (Prior art)

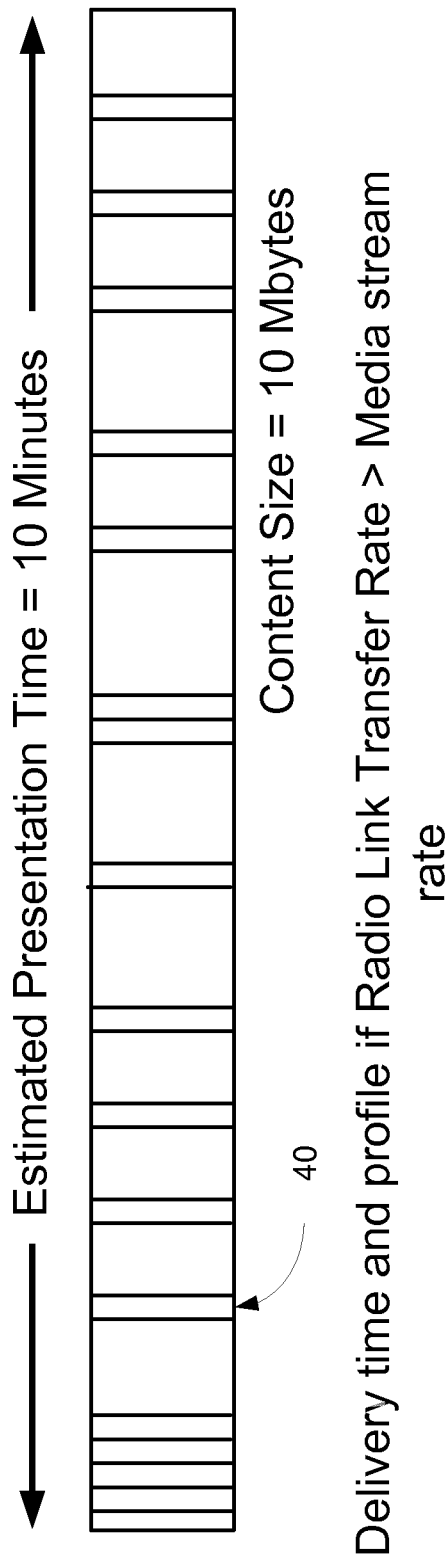
Figure 2: Streaming Multimedia file delivery(Prior art)

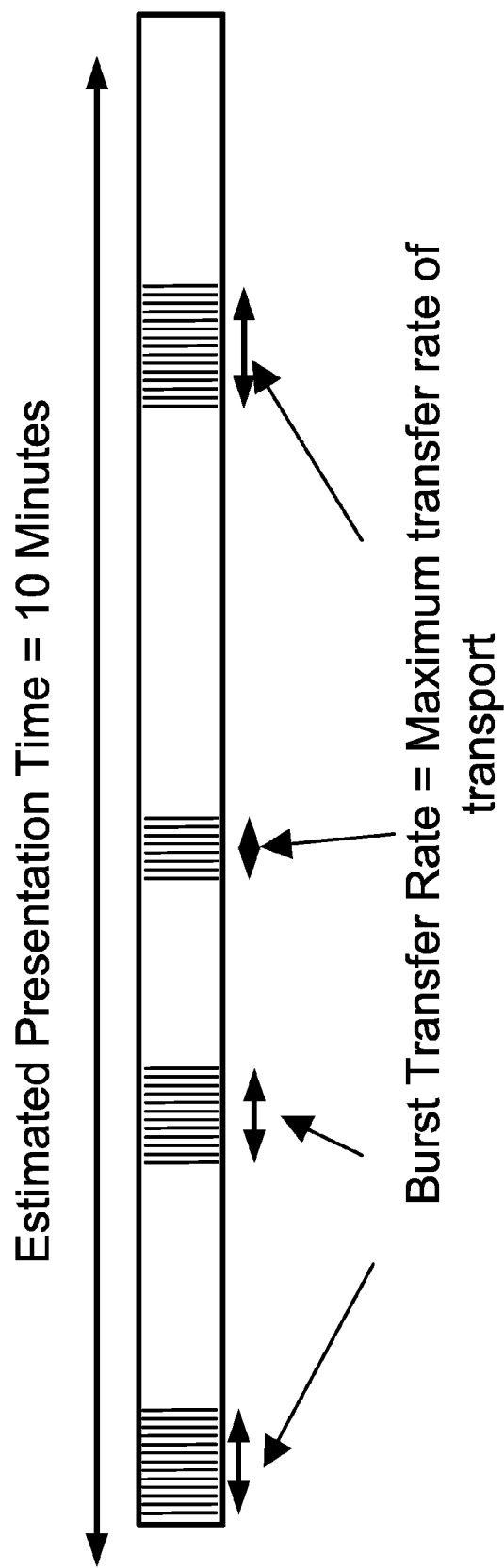
Figure 3: Multimedia file delivery

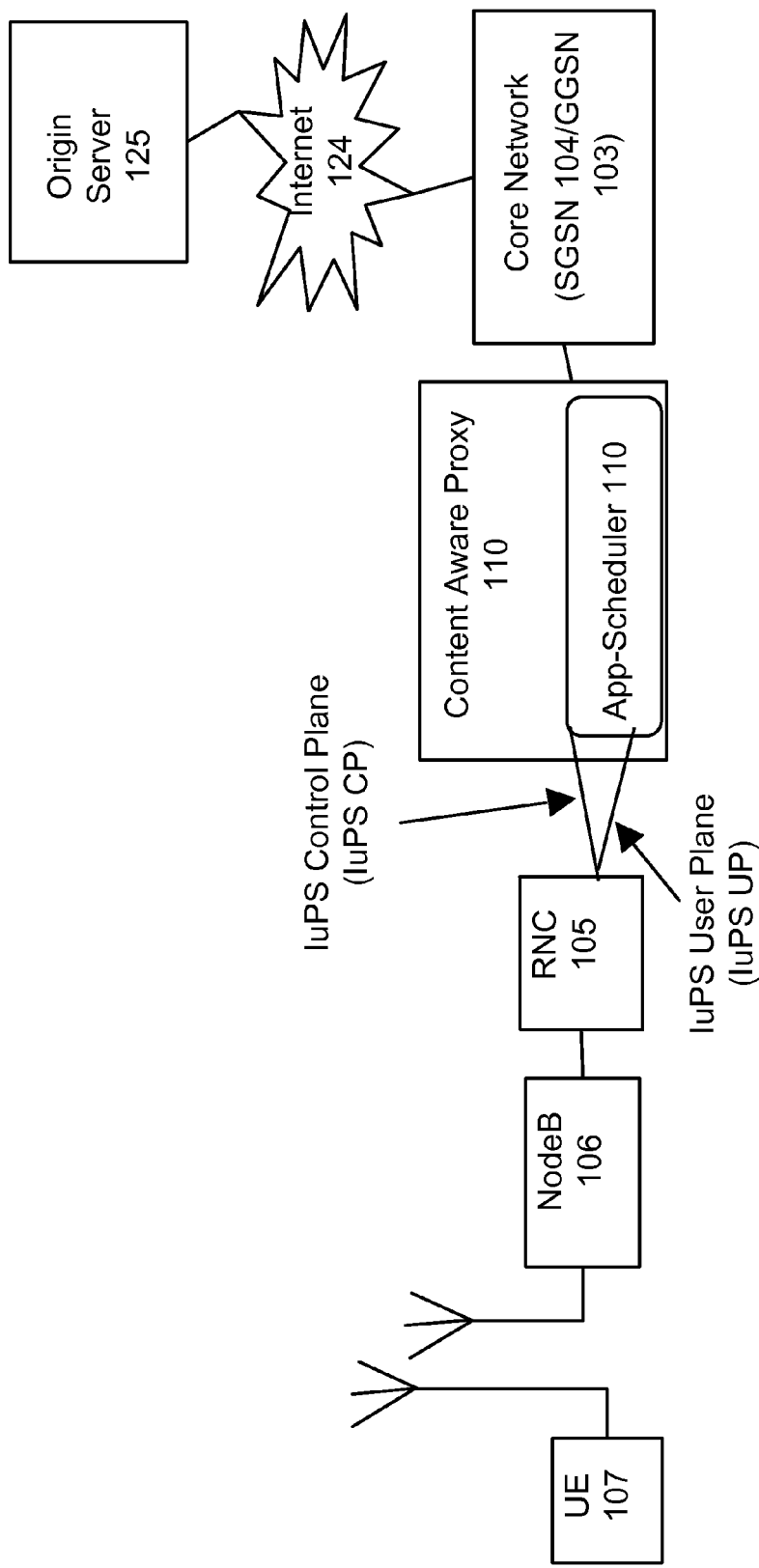
Figure 4: Sample Deployment in UMTS Network

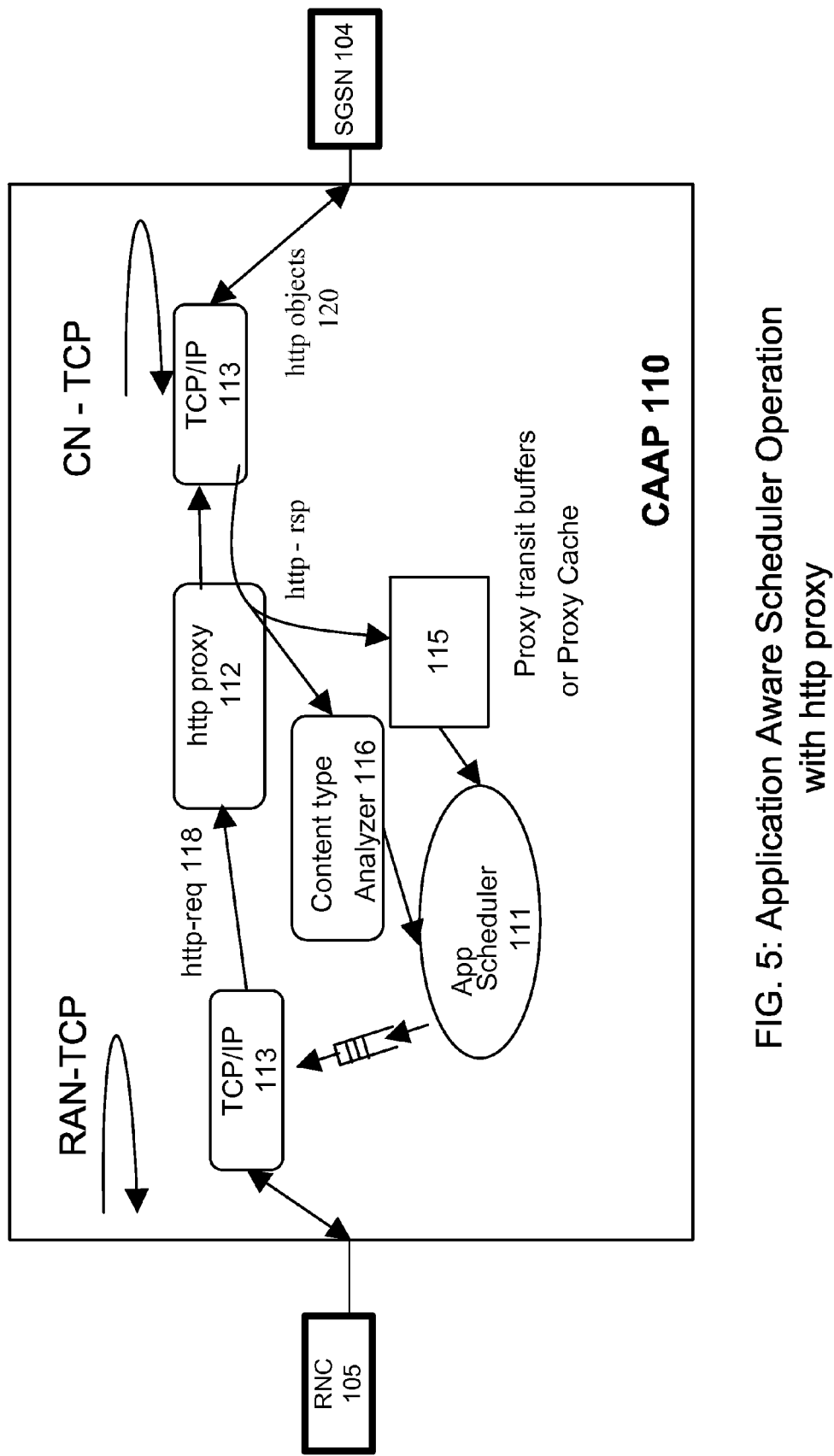
FIG. 5: Application Aware Scheduler Operation with http proxy

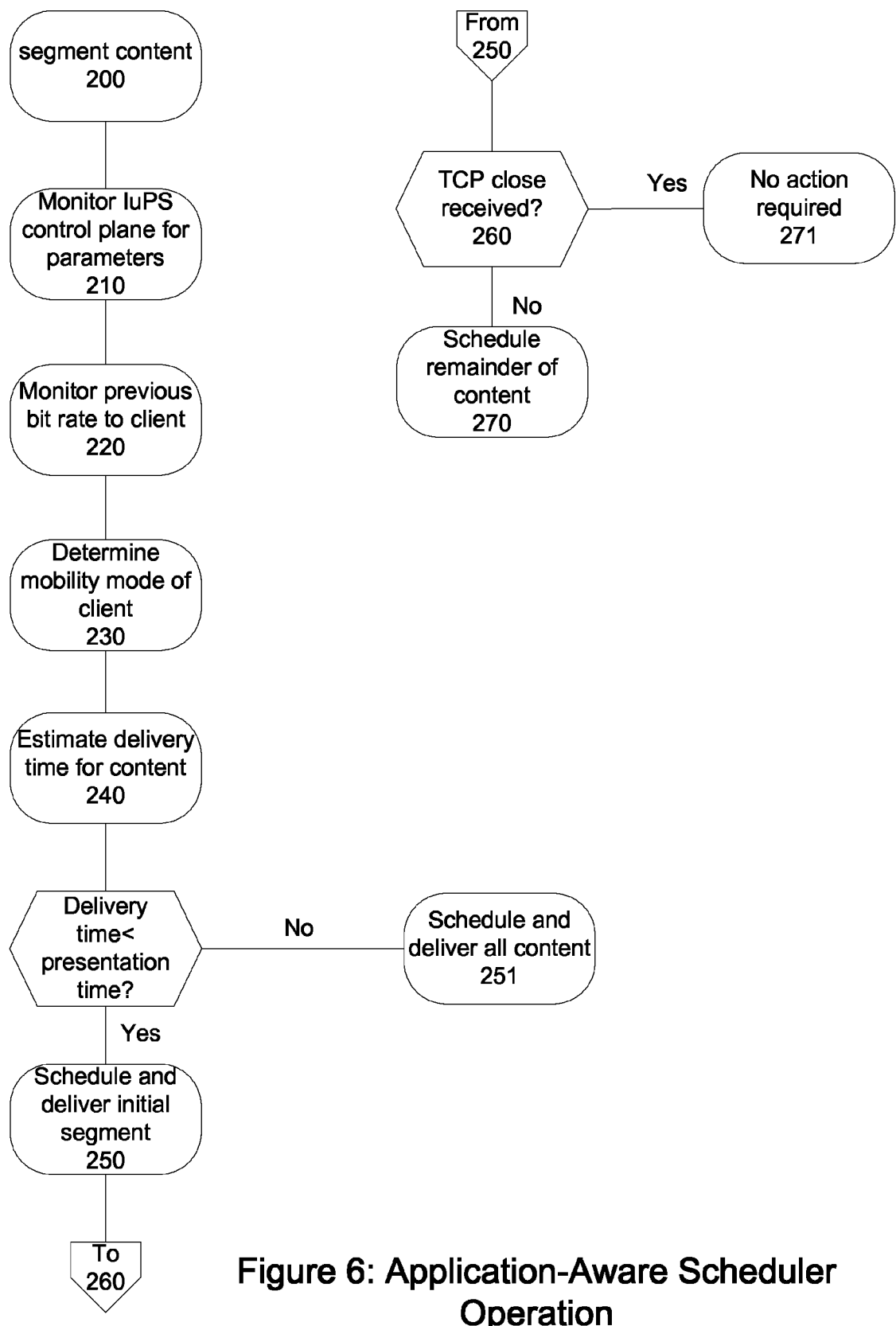
Figure 6: Application-Aware Scheduler Operation

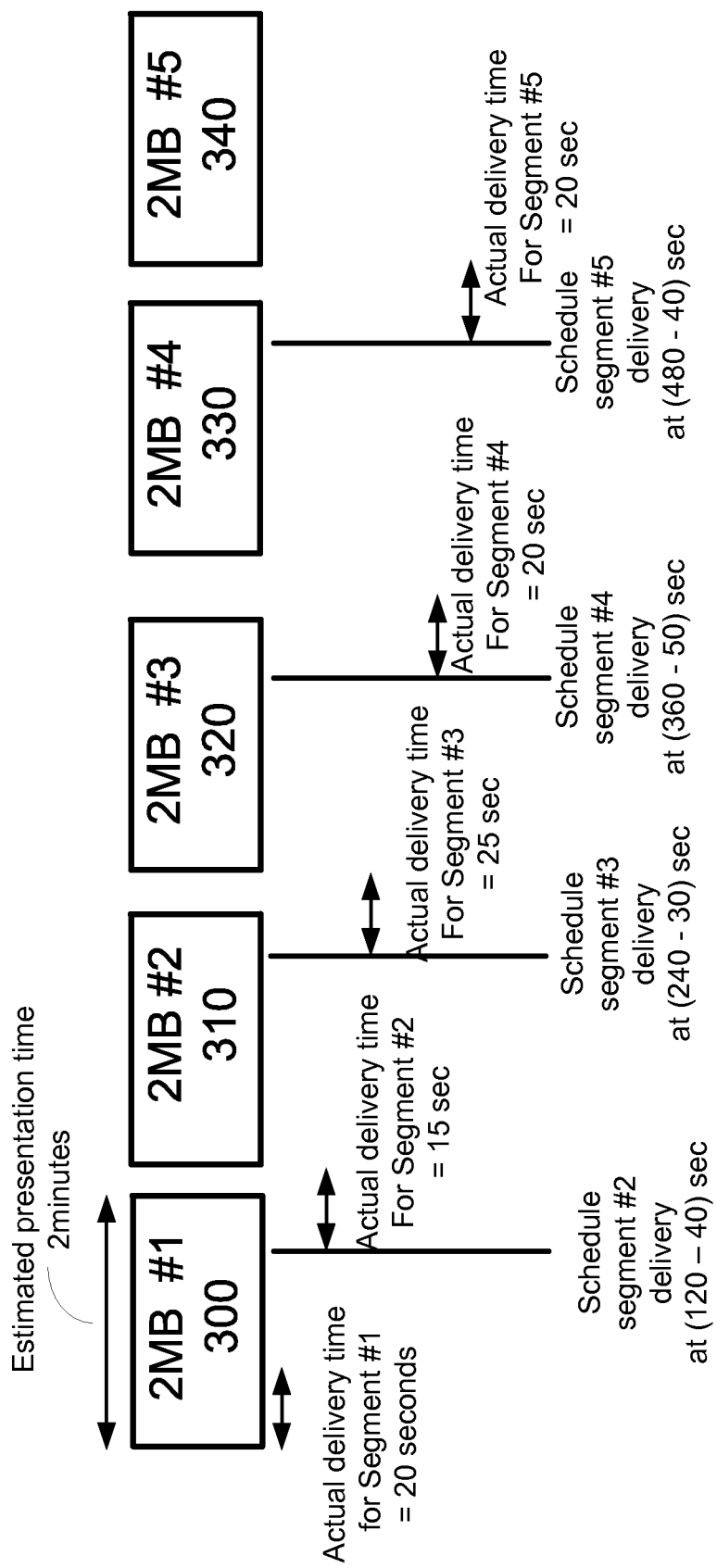
Figure 7: Application file delivery per current invention

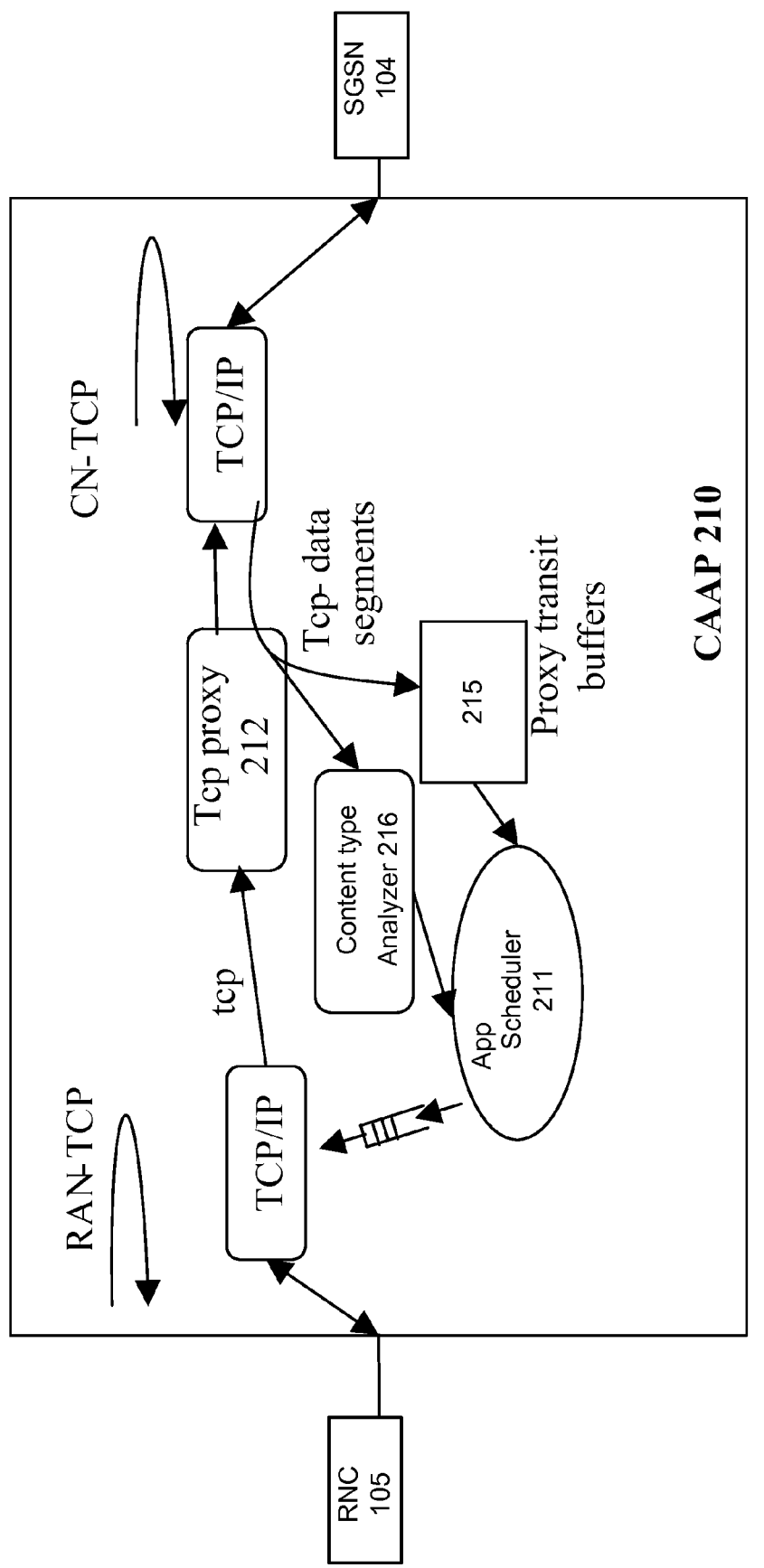
FIG. 8: Application Aware Scheduler Operation with tcp proxy

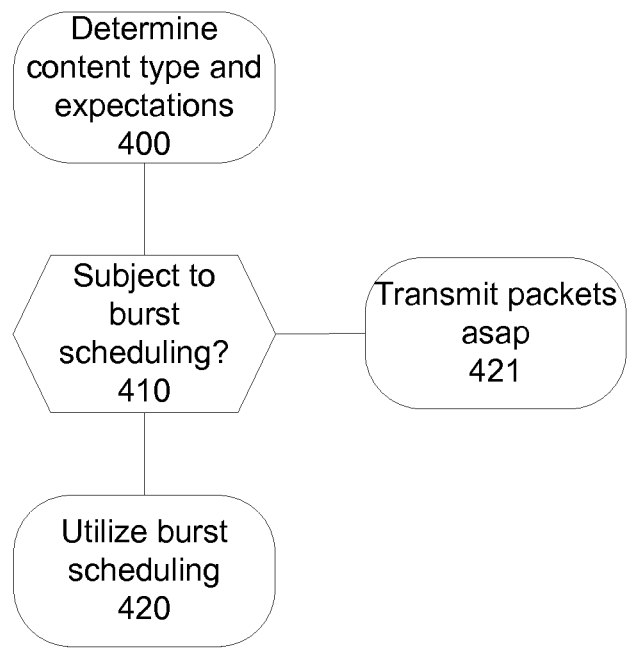
Figure 9: Application-Aware Scheduler Operation

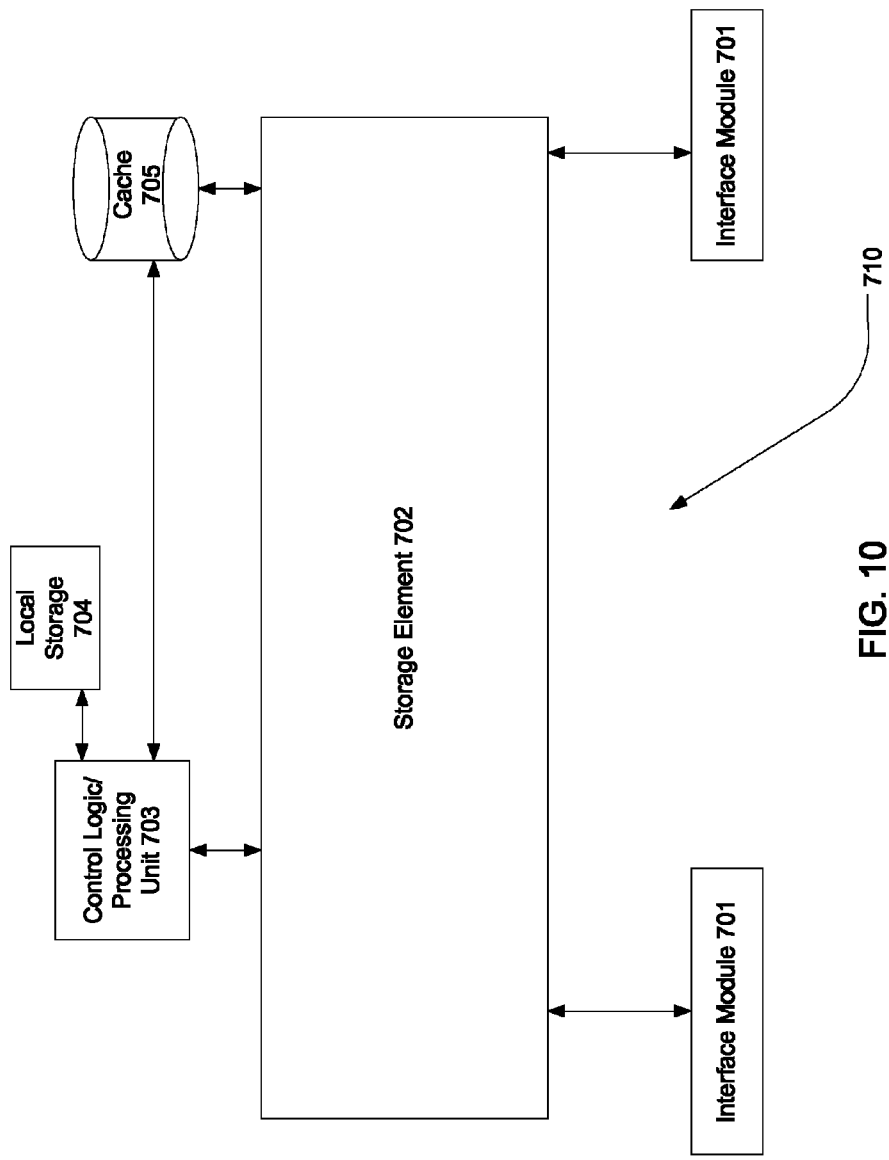

APPLICATION, USAGE AND RADIO LINK AWARE TRANSPORT NETWORK SCHEDULER

This application claims priority of U.S. Provisional Patent Application Ser. No. 61/148,454, filed Jan. 30, 2009, the disclosure of which is incorporated herein by reference in its entirety.

BACKGROUND OF THE INVENTION

Various protocols are used to transfer data over networks, both wired and wireless. Each operates according to certain rules and attempts to optimize a set of parameters.

For example, TCP/IP optimizes packet delivery for maximum bandwidth (or minimizing delay with certain options) while maintaining delivery guarantees for varying transport conditions. The sending node adjusts transmissions based on the round time delay time (RTT) and the arrival of acknowledgments (ACKs) from the remote receiving node.

For example, when large multimedia files, such as video clips, are delivered using progressive download with HTTP over TCP, the media objects are delivered at the maximum rate achievable by the underlying transport. If the transit network bandwidth and the content server delivery rate are high compared to the bit rate of the multi-media content, the video clip download completes within a small fraction of the total presentation time of content.

FIG. 1 is an example that shows the delivery of a 10 MByte media clip file 20, such as a video. FIG. 1 shows multi-media file delivery with Progressive download over HTTP/TCP transport. The figure shows a burst of TCP packets 30, comprising a 10 MB object being transferred at the rate achievable by the underlying TCP. The example assumes that the requesting client has enough buffer space to store the content, and the content source can transmit the content at a rate greater than the TCP transfer rate to the client. The file has a presentation time of about 10 minutes. In this example, this 10 Mbyte file 20 is delivered to the client using a wireless network with a Radio Link Bandwidth of 1 Mbit/Sec. FIG. 1 shows while the presentation time for the video clip 20 is about 10 minutes, the file may be delivered to the client device in about 80 seconds if the client's buffer is sufficient to hold 10 Mbytes, and transport network bandwidth is 1 Mbs at the time. The clip 20 is delivered to the client device using a series of packets 30.

In many embodiments, this behavior is acceptable, or even preferable. This allows the entire file 20 to be available very early in the presentation, thereby allowing the user to fast forward if desired. In terms of network traffic, the file is delivered quickly, thereby allowing network resources to be used for other activities.

However, if the user cancels the viewing operation, such as by clicking a different content link or closing the browser or application, while watching multi-media content, the wireless network resources used for downloaded, but not viewed, content are wasted.

Streaming Protocols (for example, Real Time Protocol using UDP (RTP/UDP), or Streaming over TCP) adjust the packet transmission rate based on the transmission rates expected by the type of encoding of the specific content. For example, some encoding utilizes constant bit rates (CBR), while other encodings utilize variable bit rates (VBR). Based on this, the sending node, or streamer, and the transport protocol adjust the packet rate to match the content bit rate. The transit network devices may police or rate shape the traffic to the corresponding bit rate (either CBR or VBR). Performing rate shaping based on the encoding type delays the start of presentation (since the decoder needs to receive packets for the frame buffer at the CBR/VBR stream rate independent of the underlying transport). Furthermore, since the traffic source (streamer) and the transport protocol are performing rate-shaping on the packet streams, the underlying network needs to guarantee jitter for delivering such streams. Jitter guarantees are impossible to achieve under varying link conditions, such as in wireless access networks. The streamer or rate scheduler presents packets to the network based on the encoding rate of the content independent of transport rate that the underlying network, such as a mobile wireless network, could support at that instant.

FIG. 2 shows multi-media file delivery using streaming, where the streamer controls the transfer rate per the content encoding rate. The streaming protocol could be RTP/UDP or RTMP/TCP. The short term transfer rate on the wireless medium may not be the maximum transfer rate achievable on the wireless portion of the network. Packets 40 are delivered throughout the presentation time, based on the rate shaping that is performed.

Other streaming protocols, such as Real Time Messaging Protocol (RTMP), minimize wasted network bandwidth for media content transferred to the client but not viewed, by limiting the amount of content transferred ahead of the presentation time. The protocol uses a client player and a server that cooperate to control buffering in the client. The protocol also measures transit network bandwidth and selects alternate resolutions of the same content. However, this protocol requires cooperation between the client and server to monitor the client's buffer. This capability may not be readily available for all playback mechanisms.

It would be beneficial if there were a system and method that maximized network resources, while also contemplating that many video clips are terminated early during their presentation. It would be advantageous if such a system operated seamlessly with existing protocols and applications.

SUMMARY OF THE INVENTION

The problems of the prior art are overcome by the present invention. A packet scheduling method and apparatus with the knowledge of application behavior, anticipated usage/behavior based on the type of content, and the underlying transport conditions during the time of delivery, is disclosed. This type of scheduling is applicable to a content server or a transit network device in wireless (e.g., 3G, WIMAX, LTE, WIFI) or wire-line networks. Furthermore, methods for identifying or estimating rendering times of multi-media objects, segmenting a large media content, and automatically pausing or delaying delivery are disclosed. The scheduling reduces transit network bandwidth wastage, and facilitates optimal sharing of network resources such as in a wireless network.

As stated above, it is important to note that other content delivery optimization solutions, particularly for delivering multimedia (for example RTMP, HTTP Streaming, Adaptive Bitrate Streaming etc.), use a different protocol, client side applications, protocol enhancements (for example additional tags), different encoding, transcoding, or alternative container formats. Such methods require support in both clients and servers, or require more intensive packet processing thus making them not scalable, and unsuitable for deployment in a transit network device. The present invention operates at the tcp and transport protocol level, without requiring protocol modifications and, therefore, can operate in a transparent manner.

BRIEF DESCRIPTION OF THE DRAWINGS

FIG. 1 shows multi-media file delivery with Progressive download over HTTP/TCP transport.

FIG. 2 shows multi-media file delivery using streaming, where the streamer controls the transfer rate per the content encoding rate.

FIG. 3 shows multi-media file delivery with progressive download using HTTP/TCP per the present invention.

FIG. 4 is an example deployment where the Application Scheduler component is incorporated into a Content Aware Application Proxy.

FIG. 5 shows the operation of the Application Aware Scheduler with a http proxy.

FIG. 6 is a flowchart showing the execution of the Application Aware Scheduler according to the embodiment of FIG. 5.

FIG. 7 shows the scheduled deliveries of segments of a media file according to one embodiment of the present invention.

FIG. 8 shows the operation of the Application Aware Scheduler with a tcp proxy.

FIG. 9 is a flowchart showing the execution of the Application Aware Scheduler according to the embodiment of FIG. 8.

FIG. 10 is an illustration of one embodiment of a Content Aware Application Proxy used with the present invention.

DETAILED DESCRIPTION OF THE INVENTION

To overcome the bandwidth and latency problems outlined above, the present invention delivers the media file in multiple segments. FIG. 3 shows multi-media file delivery with progressive download using HTTP/TCP per the present invention. The total content is divided into large segments based on content type. For example, larger segment sizes may be used for high definition (HD) content than for standard definition (SD) content. Each segment size is estimated as a 'consumable quantity' by the client application and expected user behavior. For example, the 'consumable quantity' may be small number of GOPs (Group of pictures), or an estimated 1 or 2 minutes of content determined based on the multi-media encoding rate, or the relative position of the segment within the content file (for example starting position, percent completed, etc.) The figure also shows each segment is transferred at the maximum rate achievable in the underlying TCP/IP transport.

The present invention schedules and delivers application data segments over a network, based on the knowledge of the specific application data. This application knowledge may be derived based on the application type/port (e.g. if that port use is unique, for example an SCP or FTP well known ports for file transfers). In addition, that knowledge may be derived based on the content type within the application protocol, such as HTTP, where the content-type is specified in HTTP response headers. Knowledge may also be obtained using object meta data, such as FLV section headers, to determine client/agent type that will use the received content data, the size of content (if known) and other parameters.

For large multi-media objects, such as video clips, the present invention uses the content source or a content proxy or transit network device, to segment the multimedia content into multiple large segments. The presentation times are identified or estimated, and each segment is scheduled for transmission with a delivery deadline. Although the term "presentation time" is used throughout this disclosure, it is understood, that the metric of interest is the time required by the user or client device to consume the data. In the case of multi-media files, this is often synonymous with presentation time. For other file types, such as encrypted files, the consumption rate may be related to the rate at which the user device can process the received file. For each segment, the Application Aware Scheduler determines the deadline (time before which the segment should be transmitted to the client), and presents the segments to the underlying transport (TCP or UDP). The underlying transport transports each segment at the maximum rate that is achievable at that instant by the wireless transport.

By using a transit network device such as a content aware application proxy (CAAP), shown in FIG. 4, the Application Aware Scheduler has visibility to bandwidth usage for all client devices in a sector or service area, and may determine optimal schedule. Unlike other streaming protocols such as RTMP, the present invention does not utilize a new protocol; it operates transparently to existing protocols, such as HTTP, by presenting content segments to the underlying transport based on estimated deadlines of the content usage by the receiving client. The underlying transport (TCP or UDP) transmits the segment at the maximum rate supported by the network.

Another aspect of the present invention serves to segment the content into an initial portion, and a remaining portion (for example, an initial 2 minute portion and a remaining 8 minute portion in a 10 min media clip), and schedule the first segment at the maximum rate that the underlying TCP/UDP transport can support. The present invention then delays the delivery of the remaining portion based on the expected presentation, or consumption, time of the first segment.

If the user migrates away from the current media clip during rendering of the initial portion, the transit proxy or server receives a connection close message (TCP-FIN) from the client. When this connection close message is received, the transit proxy stops sending any remaining segments, thus reducing RAN Resources. Such an operation limits the packets in transit from the content server to the client or from the inline proxy to the client. As an additional benefit, if the user migrates to a new media clip, any subsequent packets directed toward the same client as a result of user migrating from one media-clip to the next will be received faster, thus reducing application startup time.

The Application Aware Scheduler described in the present invention schedules packets towards the client device based on or more of the following criteria:

1. Content type and size. For example, the content type may be obtained from the http headers or based on application protocol type (TCP/UDP Port Numbers), or content meta-data.
2. Estimated duration of presentation (for example multi-media presentation time from the http response headers or metadata in the object) or consumption.
3. Client device type, such as user-agent type within http request header, and client device features, such as screen-size etc.
4. QoS parameters negotiated when the session to the client device is established (for example, during Radio Access Bearer Establishment in UMTS network), that is obtained by snooping the Control Plane protocol elements.
5. Channel Quality Index (a measure of the Air-Link bandwidth to the client device). This may be obtained by a transit network device (such as the Application Aware Proxy Device in FIG. 4), or it may be obtained from an application or utility running on the client device.

6. Current Sector load on the wireless network where the client device is located. Sector load is estimated when the Application Aware Scheduler is deployed in the content aware proxy device (as in item 5 above) by monitoring sector/location information during session establishment by the client.
7. Estimated bandwidth to the client from recent history, and predicted mobility mode of the client (for example, if the same bandwidth is achieved to the client over an extended period of time, it could be inferred to be a stationary client).
8. Relative position of the content segment relative to the expected presentation time to the user.
9. Relationship of current content being delivered relative to new requests received.
10. Estimated importance of the content being delivered to the client device relative to other requests received from same client device/application.

The Application Aware Scheduler may be incorporated in a variety of locations, including but not limited to, in a Content Aware Application Proxy in the RAN, in a Content Aware Application Proxy in the Core Network, or in a Server Node. Depending on where the Application Aware Scheduler is incorporated, it uses one or more of the above parameters while delivering locally cached content, or transit network content (for example cache-miss in a proxy), or from a transit flow-buffer using split-tcp, or from a backend file server in a web-server configuration.

FIG. 10 shows a representative block diagram of the Content Aware Application Proxy 710. The CAAP 110 has two interface modules 701, each of which is adapted to implement the hardware signaling required for the chosen interface and the associated software protocol. This interface protocol may be IuB, IuPS or Gn, as shown in FIG. 4. Each interface module 701 is adapted to receive and transmit on the selected interface. Additionally, received data is placed into a storage element 702, typically a semiconductor storage element such as a RAM, DRAM or an equivalent technology. The movement of data from the interface module 701 to the memory 702 and vice versa may be accomplished using dedicated hardware, such as a DMA controller. Alternatively, a dedicated data movement processor may be used to handle the actual movement of data through the CAAP 710. Once stored within the CAAP 710, the information is processed in accordance with the RAN specifications. This may be done using dedicated control logic or a processing unit 703. The control logic/processing unit 703 may have its own local storage element 704, which contains instructions to execute and local status. This storage element may be RAM or DRAM. In addition, at least a portion of this storage element 704 may be non-volatile, such as ROM, FLASH ROM, hard disk, Solid State Disk, or the like. Using known specifications and protocols, the control logic/processing unit 703 parses the received information to understand the packet at each protocol layer. Also included may be a large storage element 705, adapted to hold cached information. In some embodiments, this cache storage may be semiconductor memory, such as RAM or DRAM. In other embodiments, this cache storage may be a rotating media, such as a disk drive or other large storage device. The control logic/processing unit 703 may be physically implemented in a variety of technologies. For example, it may be a general-purpose processor, executing a set of instructions from an internal or external storage device.

In another embodiment, a dedicated hardware device having embedded instructions or state machines may be used to perform the functions described. Throughout this disclosure, the terms "control logic" and "processing unit" are used interchangeably to designate an entity adapted to perform the set of functions described.

The CAAP 710 also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

FIG. 4 shows a traditional 3G/UMTS network, including an UE (user equipment) 107, NodeB (or base transceiver station) 106, RNC (radio network controller or base station controller) 105, SGSN (Serving GPRS support node) 104, and a GGSN (gateway GPRS Support node) 103. IuB is the protocol used between Node B 106 and the RNC 105. Similarly, IuPS is the protocol used between the RNC 105 and the SGSN 104.

The Core Network is made up of the GGSN 103 and the SGSN 104. The GGSN 103 (Gateway GPRS Service Node) connects the mobile wireless network to the IP Core Network. The Gateway GPRS Support Node (GGSN) 103 is a main component of the GPRS (General Packet Radio Service) network. The GGSN 103 is responsible for compatibility between the GPRS network and external packet switched networks, such as the Internet and X.25 networks.

When viewed from an external network, the GGSN 103 appears as a router to a sub-network, because the GGSN 103 hides the GPRS infrastructure from the external network. When the GGSN 103 receives data addressed to a specific user, it checks if the user is active. If it is, the GGSN 103 forwards the data to the SGSN 104 serving the mobile user. However if the mobile user is inactive, the data are discarded, or a paging procedure is initiated to locate and notify the mobile device. For data originated within the GPRS network, the GGSN 103 routes these mobile-originated packets to the correct external network.

The GGSN 103 converts the GPRS packets coming from the SGSN 104 into the appropriate packet data protocol (PDP) format (e.g., IP or X.25) and sends them out on the corresponding packet data network. For incoming packets, the PDP addresses are converted to the GSM address of the destination user. The readdressed packets are then sent to the responsible SGSN 104. In order to accomplish this function, the GGSN 103 stores the current SGSN address of the user and its associated profile in its location register. The GGSN 103 is responsible for IP address assignment and is the default router for the connected user equipment (UE) 107. The GGSN 103 also performs authentication functions.

A Serving GPRS Support Node (SGSN) 104 is responsible for the delivery of data packets from and to the mobile stations within its geographical service area. Its tasks include packet routing and transfer, mobility management (attach/detach and location management), logical link management, and authentication and charging functions. The location register of the SGSN 104 stores location information and user profiles of all GPRS users registered with this SGSN 104.

The Radio Network Controller (or RNC) 105 is a governing element in the radio access network and is responsible for controlling the Node Bs 106 that are connected to it. The RNC 105 carries out radio resource management, some of the mobility management functions and is the point where encryption is done before user data is sent to and from the mobile. The RNC 105 connects to the SGSN (Serving GPRS Support Node) 104 in the Packet Switched Core Network.

Node B 106 is a term used to denote the base transceiver station (BTS) in the UMTS/3GPP Architecture. As in all cellular systems, such as GSM, Node B (or BTS) 106 contains radio frequency transmitter(s) and the receiver(s) used to communicate directly with the user equipment, which move freely around it.

FIG. 4 also shows an example deployment of the software application (or Scheduler Application) in accordance with the present invention. In this Figure, the Application Aware Scheduler 111, which is a software application, is incorporated in a Content Aware Application Proxy (CAAP) 110 in the Radio Access Network. U.S. patent application Ser. No. 12/536,537, filed Aug. 6, 2009, which is incorporated herein by reference in its entirety, discloses an example of Content Aware Application Proxy in Radio Access Network. In some embodiments, the Content Aware Application Proxy 110 is located between the Core Network and the RNC 105, although other placements are possible and within the scope of the invention.

The Content Aware Application Proxy intercepts both control and user plane protocols (IuPS CP, and IuPS UP). In such deployments, where both RAN control and user plane protocols are intercepted, the Application Aware Scheduler 111 has visibility to each UE session, the type of client device, the QOS parameters assigned by the operator network, and the bandwidth requirements by other clients in the same sector or service area.

The Application Aware Scheduler 111 may be used in a variety of modes. FIG. 5 shows the Application Aware Scheduler located within a CAAP device 110 (HTTP Proxy or TCP Proxy). The operations are described using multi-media file transfers over TCP/IP transport. In the description with HTTP, progressive download of multi-media content is assumed, where the client player starts rendering the content to the user before the entire object is fully downloaded.

The Content Aware Application Proxy device 110 shown in FIG. 5 is an inline proxy with http-proxy 112, http caching, and tcp-proxy components 113. The CAAP 110 receives http objects 120 from the SGSN 104. These objects originate in the core network and/or internet. In some embodiments, the content is sourced at the Origin Server 125 (see FIG. 4). The CAAP 110 holds the received objects 120 in caches or transit buffers 115 (for example non-cacheable objects). The Content-Type analyzer component 116 determines the type of content from the response headers, TCP Port numbers, or the application metadata.

The http-proxy component 112 receives client requests 118 for content and determines if the requested content is available in its cache 115 or needs to be fetched from the origin server 125 through the internet 124 or transit network.

The CAAP 110 performs split-tcp operation while delivering content to the client device. In other words, the CAAP 110 maintains a connection with the client device, and if the content is locally not available in its cache 115, fetches the content from the Origin server 125 using a different TCP connection or UDP transport.

Content-type analyzer 116, in coordination with http-proxy 112, determines the content type, length, and presentation time (if available in the files that reference the content), or estimates the total presentation time that the client would require to present the content to the end user.

From the information ascertained above, the CAAP 110 determines if the content requested by the client should be served using the Application Aware Scheduler 111. The Application Aware Scheduler 111 follows the remaining steps for eligible content types and lengths.

First, as shown in step 200 of FIG. 6, the Application Aware Scheduler 111 segments the content into an initial segment, and a remaining segment. For example, for a 10-minute video, the segments may include a 2 minute initial segment and a 8 minute remaining segment. The Application Aware Scheduler 111 computes the size of the content segments using the same proportion, for example 20% of the data is sent as part of the initial segment and 80% of the data serves as the remainder.

In step 210, the Application Aware Scheduler 111 monitors the IuPS control plane traffic exchanged between RNC 105 and Core Network (CN) 104, and determines QoS parameters associated with the current Client device, such as type of Radio Bearer, maximum bit rate and others. It also determines the device type, such as whether the user device is a PC adapter, smart-phone, or feature phone.

In step 220, the CAAP 110 monitors the previously achieved bit-rate (recent history) to the client via one or more TCP connections, and recent variations in achieved bit rate to the client for previously transmitted packets.

Based on the QoS and bit-rate information obtained in steps 210 and 220, the Application Aware Scheduler 111 estimates the mobility mode of the client device (i.e. stationary, nomadic, or vehicular mobility), and estimates the delivery rate to the client device, as shown in step 230. For example, if the client device is a PC dongle (from step 210, or based on the user-agent in http-request headers), and the achieved bit-rate to the client is relatively invariant, the Application Aware Scheduler 111 may assume that the mobility mode is 'stationary'.

From the content size, type of content and delivery rate, the Application Aware Scheduler 111 estimates the delivery time for the entire content, as shown in step 240. If the estimated delivery time for the total content is small compared to the presentation or consumption time, it schedules the initial segment only for transmission, as shown in step 250. The Application Aware Scheduler 111 then delays sending the second segment, anticipating that the user might migrate away from current clip while the initial portion is being presented.

If the delivery time is approximately the same as the presentation time, the Application Aware Scheduler 111 simply schedules all of the content for delivery, as shown in Step 251.

In some scenarios, the user migrates away from the multi-media file, perhaps having determined that the content is not of interest. In other cases, the user may continue to watch the same clip. The user's decision can be determined by monitoring a "TCP connection close" is received within a predetermined time, as checked in step 260. If this does not occur, the Application Aware Scheduler 111 schedules the remaining segment with a deadline time less than estimated the presentation time of the initial segment, as shown in step 270. If a "TCP connection close" is received, the remaining segments are not scheduled for delivery, as shown in step 271.

As an extension to the operation in Step 270 above, the Application Aware Scheduler 111 may segment the remaining content into multiple segments. For example, rather than a single 8 minute segment, multiple segments may be created. Each segment size may correspond to 2-minute presentation segments. The Application Aware Scheduler 111 then schedules and delivers each segment at maximum delivery rate. Thus, each segment is delivered at Maximum Radio-Link delivery rate, but each segment is delivered close to the presentation rate. This method is illustrated in FIG. 7 as an example of content segmentation, and Application scheduling per the present invention.

Referring to FIG. 7, the first segment 300 (Segment #1) is delivered during the presentation time of that segment 300. Since the delivery rate is much greater than the presentation rate, the Application Aware Scheduler 111 waits before delivering Segment #2 310. The Application Aware Scheduler 111 determines that Segment #2 310 must be delivered by the deadline of 120 sec (the time required to present the first segment). Knowing that Segment #1 300 was delivered in 20 seconds, the Application Aware Scheduler 111 allows for variation (in this example, by doubling the previous delivery time) and schedules Segment #2 310 to begin delivery at (120-40), or 80, seconds. The process is repeated again for Segment #3 320. Since Segment #2 310 was delivered in 15 seconds, the Application Aware Scheduler 111 allows 30 seconds for the delivery of Segment #3 320. Thus, it begins delivery of Segment #3 320 at (240-30), or 210, seconds. This process is repeated for Segment #4 330 and Segment #5 340.

FIG. 8 shows a second embodiment of the Application-Aware Scheduler 211. In this embodiment, the Application Aware Scheduler 211 is used with a tcp-proxy 212 in a Content-Aware Application Proxy device 210. For standard applications, such as FTP, SCP and others that use well-known ports, the Application Aware Scheduler 211 uses a specific software component that decodes the application protocols. For example, software may snoop the initial exchange to determine the content size. For other ports that are not well known tcp-ports, the application attributes may be inferred from the content source site or from the configuration of the content source site, its type, etc. For example, any transfers from sites such as "update.microsoft.com" could be configured as large file transfers that do not require completion with interactive latencies, and the CAAP may schedule these as low priority with longer completion deadlines. In co-ordination with tcp-proxy, CAAP schedules them after configured threshold sizes (for example 1 MB) are buffered in the transit proxy buffer.

Thus, the Application Aware Scheduler 211 may use the information such as protocol type (such as http or tcp), the source site (such as a known video download site), or the configuration of the source site, to determine whether the content can be delivered in accordance with the present invention. If it can be so delivered, the Application Aware Scheduler 211 may then estimate the delivery time using the techniques described above.

FIG. 9 shows a flowchart of the actions of the Application Aware Scheduler 211 in this embodiment. The content analyzer component 216 determines the type of content, and estimates the expectations of the client while receiving the content, as shown in step 400. The content-type and client expectations are determined based on one or more of the following:

(a) Well known TCP ports such as FTP, SCP, SIP etc.,
(b) specific application knowledge components, such as one which can understand protocol Request/Response headers in order to decode content size, type, and other parameters,
(c) file-types in file names,
(d) domain-name and file name of the object,
(e) packet sizes during initial packet exchanges, for example, voice over IP packets using small packet sizes, and P2P traffic using predominantly maximum packet sizes,
(f) user configuration for specific domain names, and port numbers etc., or
(g) previously completed transfers using the same pair of application ports (TCP/UDP) between the content source and the client.

From the classification in step 400 above, the Application Aware Scheduler determines if the packets received from the Core Network should be subject to the burst scheduling, or should be transmitted to the RAN with minimum delay, as shown in step 410. For example, if the Application Aware Scheduler 211 determines that the client application is a delay sensitive application, it transmits the subsequent packets with minimum delay, as shown in step 421.

For high volume data transfer applications that are not sensitive to delay (for example large file transfers, software updates etc.), the Application Aware Scheduler uses burst scheduling as shown in step 420. The Application Aware Scheduler 211 stores a segment of the file by buffering it in the proxy transit buffers; it limits the amount of data buffered in the transit buffer by back-pressuring the content source on the Core Network. When a sufficiently large segment is available in the proxy transit buffers, it is then sent to the client device. As described above, the CAAP may use split/tcp operation to achieve this.

If the classification in Step 410 above determines that the client is an interactive multi-media application, CAAP performs content segmentation and deadline based delivery as explained in FIG. 6.

Additional functions, such as IuPS control plane monitoring, measuring the recently achieved bandwidth to the client device, and estimating the delivery rate and priority for the specific content, are performed as previously described in connection with the http-proxy operation in FIGS. 5 and 6.

It is important to note that the actual delivery of a content segment, for example a 4 MByte data segment of a large application data file (for example, a 20 MByte file) would be transmitted as multiple IP packets per the corresponding transport protocol such as TCP or UDP, or specific application protocol above TCP/UDP. The present invention buffers and segments this content, as large segments and presents them to the underlying transport (or application) so that the segments can be transmitted to the mobile client at the maximum efficiency, fairness, user priority, and expectations from client applications to achieve optimal RAN utilization, and QoE for a number of users.

The previous description discloses the use of the Application Aware RAN Scheduler while delivering multimedia files. The present invention can be extended with additional application knowledge to other types of content delivery.

Other features can be incorporated into the Application Aware Scheduler. For example, the Application Aware Scheduler may estimate the expectations of the client as it consumes the content that the Application Aware Scheduler is transmitting, and estimate link bandwidth to the client. Based on these parameters, the Application Aware Scheduler may present content segments to the underlying transport (TCP or UDP) for best RAN utilization, based on RAN congestion, application type, user priority and fairness configured by operator.

In addition, the Application Aware Scheduler may understand the relationship between certain application requests. For example, when user selects a video clip for viewing on a laptop with a Wireless Adapter (2G/3G, WCDMA, WIMAX), the client-browser may commonly issue a request for the video clip, and a number of other requests (on one or more additional TCP connections) that will fill the side bars with playlists, related content, and other advertisements. The additional requests could be to the same server, or multiple servers on different websites. The responses from all these requests compete for RAN Network Resources (such as RNC, BTS, Wireless Bandwidth etc.). Knowing that most browsers operate in this fashion, the Application Aware Scheduler per present invention may identify the primary request of interest, and delay or block delivering other extraneous additional content if the radio-link bandwidth is limited.

Additionally, the Application Aware Scheduler may use the information within the incoming requests to ascertain what operation is being performed. For example, when requests from the same client application are received, such as multiple requests for the same object (such as a long multi-media clip) with differing byte ranges, the Application Aware Scheduler speculates as to whether the new requests are as result of a user seek/fast forward operation, or the browser issuing multiple requests in advance, and limits responses sent to the client device accordingly, thus limiting the transit pipelines.

Additionally, when requests from the client application are received for objects that are different from previous content, but for the same content type, for example, another media-clip, it delays sending responses currently in progress thus limiting wasted RAN bandwidth, since the Application Aware Scheduler may assume that the user is migrating away to a different clip.

The terms and expressions which have been employed herein are used as terms of description and not of limitation, and there is no intention in the use of such terms and expressions of excluding any equivalents of the features shown and described (or portions thereof). It is also recognized that various modifications are possible within the scope of the claims. Other modifications, variations, and alternatives are also possible. Accordingly, the foregoing description is by way of example only and is not intended as limiting.

What is claimed is:

1. A method of delivering content to a user device on a RAN network, wherein components in said RAN network communicate using a plurality of protocols, said method comprising:

monitoring communication between said user device and other components in said RAN network to acquire parameters about said user device and said content to be delivered;

estimating the time required to deliver said content to said user device using said parameters;

estimating the time required by said user device to consume said content using said parameters;

dividing said content into a plurality of segments;

transmitting a first of said plurality of segments to said user device;

waiting a predetermined time before transmitting a second of said plurality of segments to said user device, wherein said predetermined time is calculated based on said parameters, said estimated time to deliver said content, and said estimated time to utilize said content.

2. The method of claim 1, wherein said parameters are selected from the group consisting of content type, content length, user device type, application type, QoS parameters, normal user behavior, sector load, estimated bandwidth to said user device, predicted mobility of said user device, and channel quality.

3. The method of claim 1, further comprising storing said content in a storage element prior to delivery to said user device.

4. The method of claim 1, wherein said dividing step is performed only if said estimated delivery time is less than said estimated consumption time.

5. The method of claim 1, wherein if, before expiration of said predetermined time, said user terminates use of said content, said second segment is not delivered.

6. The method of claim 1, wherein said content comprises a multimedia file.

7. The method of claim 1, wherein said parameters are selected from the group consisting of protocol type, the identity of a content source site, the configuration of said content source, packet sizes during initial transfers between said content source and said client, and previously completed transfers using the same pair of application ports between said content source and said client.

* * * * *